United States Patent [19]

Wollar

[11] 4,396,329

[45] Aug. 2, 1983

[54] PINE TREE CLIP

[75] Inventor: Burnell J. Wollar, Barrington, Ill.

[73] Assignee: Phillips Plastics Corporation, Phillips, Wis.

[21] Appl. No.: 228,143

[22] Filed: Jan. 26, 1981

[51] Int. Cl.³ .................... A44B 17/00; F16B 13/02
[52] U.S. Cl. .................................. 411/508; 24/214; 411/452; 411/510
[58] Field of Search .......................... 411/508–510, 411/452, 455; 24/213 R, 214, 297

[56] References Cited

U.S. PATENT DOCUMENTS

| | | | |
|---|---|---|---|
| 1,971,726 | 8/1934 | Norwood | 411/510 X |
| 2,853,913 | 9/1958 | Rapata | 411/508 |
| 3,080,629 | 3/1963 | Meyer | 24/297 |
| 3,137,952 | 6/1964 | Shears | 24/213 R |
| 3,412,437 | 11/1968 | Bennett | 411/509 |
| 3,810,279 | 5/1974 | Swick et al. | |
| 3,991,446 | 11/1976 | Mooney et al. | 411/508 X |
| 4,270,328 | 6/1981 | Page et al. | 24/213 R X |
| 4,318,208 | 3/1982 | Borja et al. | 24/214 X |

FOREIGN PATENT DOCUMENTS

| | | | |
|---|---|---|---|
| F 12753 | 5/1956 | Fed. Rep. of Germany | 411/510 |
| 2921957 | 12/1980 | Fed. Rep. of Germany | 411/508 |
| 1493590 | 7/1967 | France | 411/510 |
| 2020733 | 11/1979 | United Kingdom | 411/508 |

Primary Examiner—Thomas J. Holko
Assistant Examiner—Lloyd A. Gall
Attorney, Agent, or Firm—James E. Nilles

[57] ABSTRACT

The invention is a one-piece drive fastener for securing a plurality of apertured members to each other, and comprises a head from which extends a rigid shank. The shank terminates in a tip, and also has a plurality of circumferentially spaced-apart, rigid ribs which extend radially outwardly from and along the length of the shank, the ribs further having a pair of oppositely facing side walls. A plurality of axially spaced-apart, flexible flaps are integrally attached to one of the opposite side walls of at least some of the ribs, and the ribs form a sufficiently large cross-sectional width so that the shank is tightly engaged in at least one of the apertures and is thereby maintained in a substantially normal position relative to the members.

11 Claims, 13 Drawing Figures

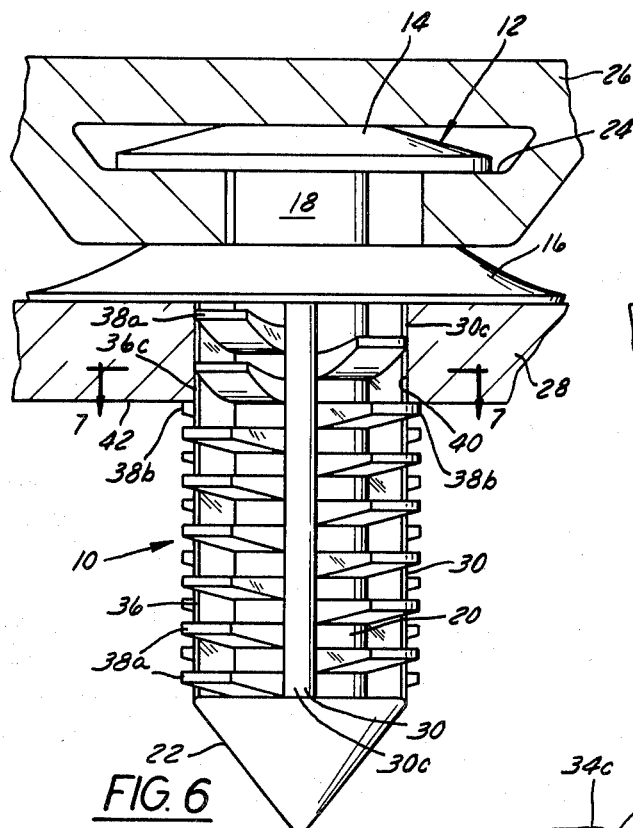
FIG. 6
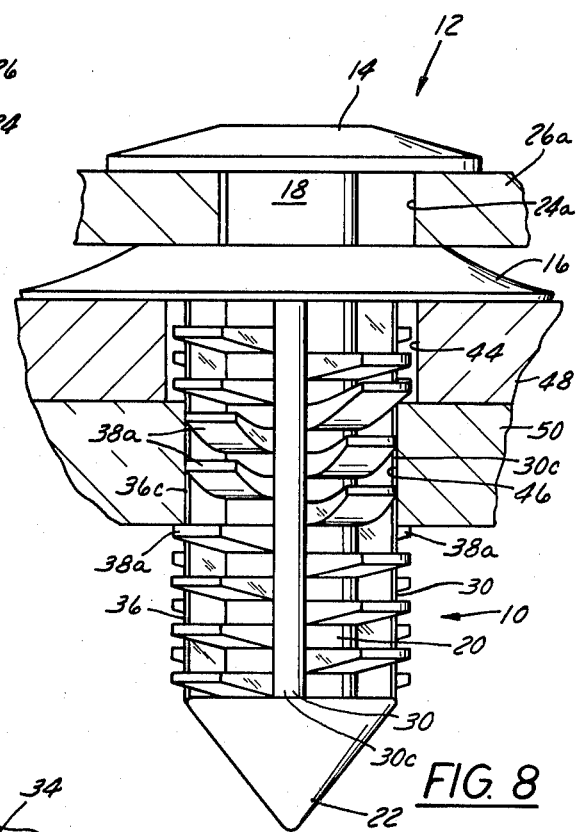
FIG. 8
FIG. 7
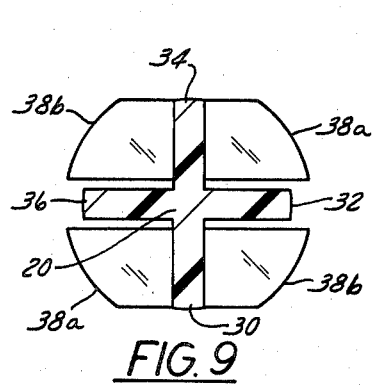
FIG. 9
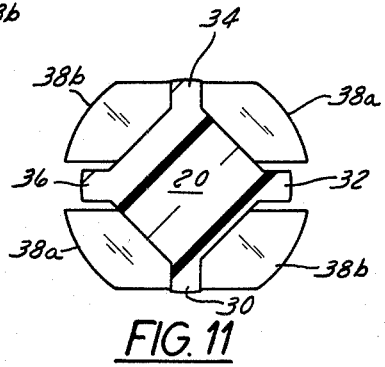
FIG. 11
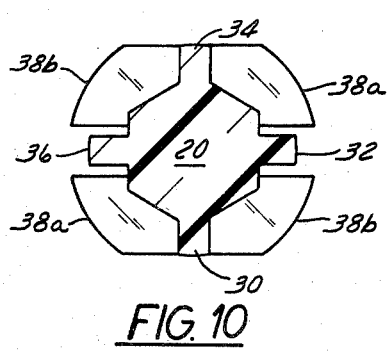
FIG. 10
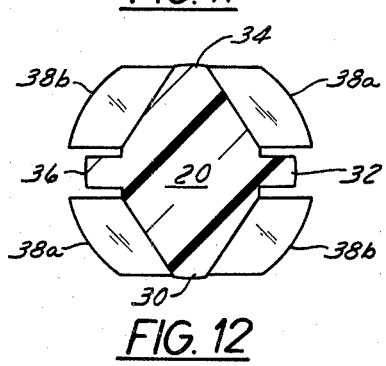
FIG. 12

PINE TREE CLIP

BACKGROUND OF THE INVENTION

The invention relates generally to a fastener for securing a pair of apertured members. In particular, it relates to a fastener for securing a pair of aligned, apertured panels and for maintaining those panels in an aligned condition.

Several fasteners are known which can secure panels of different thicknesses to one another. Even when the space between these panels is varied, one type and size of fastener is often all that is required, because of the number of axially spaced-apart wing elements along the fastener shank. Fasteners of this kind are shown in U.S. Pat. No. 3,810,279, issued to Swick et al, on May 14, 1974, hereinafter referred to as Swick. These fasteners comprise a head and a shank, the shank having a generally polygonal axially extending body portion providing a plurality of radially outwardly facing flat surfaces. The wing elements extend radially outwardly from the flat surfaces and engage the panels or apertured members. The shank and its body portion are generally smaller in cross-section that the apertures in the secured panels. The flexible wings, however, are long enough so that they will flex when inserted in an aperture and resume their normal unflexed position after passing through the aperture whereby some abuttingly engage the underside of one of the secured panels.

Because of the small cross-section of the shank, the fastener may be inserted in panels whose apertures are misaligned and will accommodate that misalignment through orientation into a tilted or non-normal position to those members. This feature of the Swick fasteners renders them utilizable for applications where misalignment of panel apertures is common and even desirable. However, there are other applications in which it is essential that the fastener maintain a normal orientation relative to the panel members, or in which the fastener aid in maintaining panel apertures in an aligned state.

Further, a fastener of the general type shown in the prior art and in other than the normal position is somewhat difficult to remove from the panel apertures. Although the shank itself does not abut the aperture periphery, the wings extending radially from the outwardly facing flat surface do. Upon insertion and removal of the tilted fastener, unequal forces will be imparted to those wings. The greater insertion or removal forces imparted to some of the wings may cause their breakage and thereby render the fastener useless.

SUMMARY OF THE INVENTION

The invention is a one-piece drive fastener for securing a plurality of apertured members to each other, and comprises a head from which extends a rigid shank. The shank terminates in a tip, and also has a plurality of circumferentially spaced-apart, rigid ribs which extend radially outwardly from and along the length of the shank, the ribs further having a pair of oppositely facing side walls. A plurality of axially spaced-apart, flexible flaps are integrally attached to one of the opposite side walls of at least some of the ribs, and the ribs form a sufficiently large cross-sectional width so that the shank is tightly engaged in at least one of the apertures and is thereby maintained in a substantially normal position relative to the members.

The fastener may have flaps secured to one of the opposite side walls of a particular rib axially offset from flaps secured to the other of the opposite side walls of that rib. This offset relationship gives the effect of reducing the axial spacing between flaps and enables the fastener to secure panels having a greater variety of thicknesses than would be possible with a non-offset configuration. The ribs of the fasteners may also have radially outermost ends in axial alignment with one another, making the fastener suitable, for example, for members having circular apertures. Because the ribs of the present invention ensure that the fastener is maintained in the normal position, all flaps are subject to relatively even pull-out forces. Thus, the likelihood of breakage of a flap from overstressing upon removal due to non-normal alignment in the aperture is practically eliminated. The fasteners may have their flaps attached only to alternate ribs along the shank circumference and on opposite side walls of each of the alternate ribs.

Other objects and advantages of the invention will appear throughout the specification.

BRIEF DESCRIPTION OF THE DRAWINGS

FIG. 6 is a side elevational view of the fastener of FIG. 1, and securing a pair of apertured members to one another, the apertured members being shown in section;

FIG. 7 is a sectional view of the fastener of FIG. 6, and taken along line 7—7, showing portions of two flaps hidden by one of the panels;

FIG. 8 is a side elevational view of the fastener of FIG. 8 securing three apertured panel members to one another, the apertured members being shown in section;

FIGS. 9–12 are sectional views through the shanks of fasteners comprising alternate embodiments of the invention.

DESCRIPTION OF A PREFERRED EMBODIMENT

Figure 1:
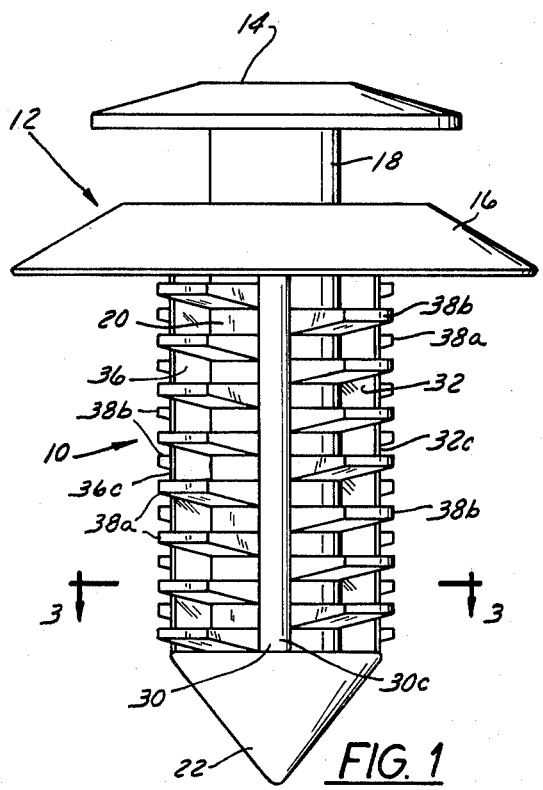
FIG. 1 is a front elevational view of a fastener constructed in accordance with a preferred embodiment of the invention.
Figure 2:
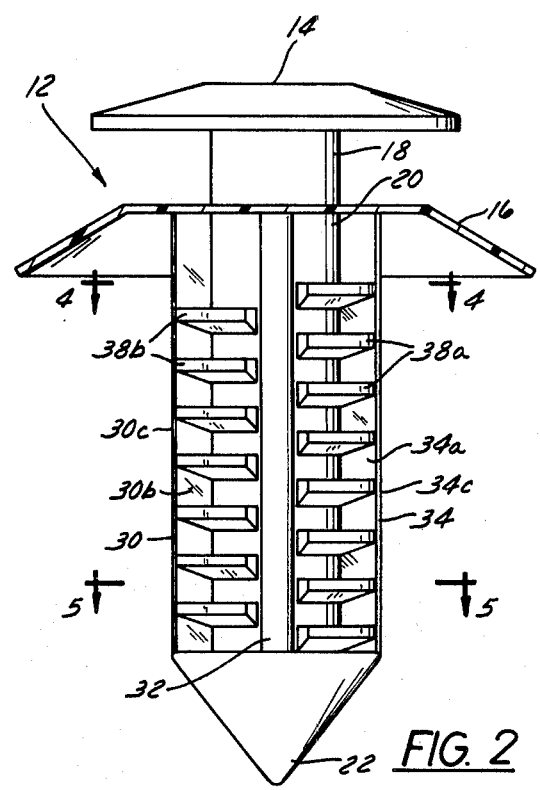
FIG. 2 is a side elevational view of the fastener of FIG. 1 in partial section.

The fastener made in accordance with the invention is of one-piece design, and of a material which is rigid in thick sections and flexible or resilient in thin sections. A plastic, such as polyethylene or nylon, is suitable for such fasteners because it meets these criteria and can also be inexpensively manufactured in a molding process using a two-piece mold. The fastener 10 is shown in FIGS. 1-8, and comprises a head 12, here having an upper head portion 14 and a lower crowned head portion 16 with an axial spacer 18 therebetween; and also comprises a rigid shank 20 extending from the head 12 and which terminates in a tip 22. The upper head portion 14 may be introduced at the edge of an upper member 26 and slideably placed into position along a lengthwise slot 24 commencing at that edge (FIG. 6), or it may be tilted and pushed through an aperture 24a in an upper member 26a to snappingly engage a surface of that member 26a (FIG. 8). The lower crowned head portion 16 is here shown as a frusto-conical shell, and is typically thin enough to exhibit the resilient properties of the material of construction. Thus, as the fastener 10 is pressed into a position abutting lower member 28 (FIG. 6), the lower crowned head 16 is compressed and tightly seals the aperture in the lower member 28 to thereby resist the introduction of dirt or moisture through that aperture.

Figure 3:
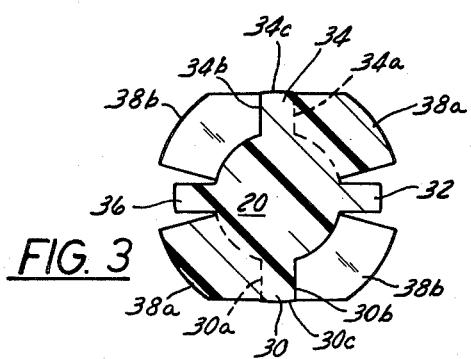
FIG. 3 is a sectional view of the fastener of FIG. 1 and taken along line 3—3.
Figure 4:
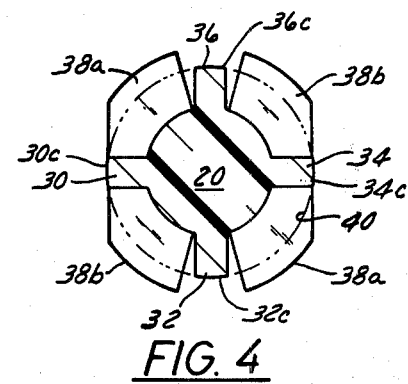
FIG. 4 is a sectional view of the fastener of FIG. 2 and taken along line 4—4, showing the position of the shank and ribs relative to an aperture in which the fastener may reside, the aperture being shown in phantom.

The shank 20 includes a plurality of rigid ribs, and in this embodiment four ribs 30, 32, 34, 36 extend outwardly from the shank in a radial direction. The ribs traverse the length of the shank and are spaced apart along the circumference of the shank. In this four-ribbed, cylindrical-shanked embodiment, the circumferential spacing between the ribs is typically 90° (FIG. 3, 4, and 7). Each of the ribs include a pair of oppositely facing side walls, the two side walls being designated by the numbers corresponding to their respective ribs and with either the suffix "a" or "b" added thereto. Thus, rib 30 includes oppositely-facing side walls 30a and 30b. In the embodiment shown in FIGS. 1-8, a line extending from the axial center of the fastener shank to the center of the radially outermost end 30c (FIG. 3) of the rib 30 would be substantially parallel to the side walls 30a and 30b. The radially outermost ends 30c, 32c, 34c, and 36c connect the respective pairs of opposite side walls, and are also in axial alignment as may be readily seen in FIG. 1. The ends 30c–30c of the fastener ribs shown in FIGS. 1-8 lie along a radius from the shank axis, as may best be seen in FIG. 4.

The fastener further includes means for preventing its axial movement after seated engagement in an apertured pair of panels. These means comprise a plurality of axially spaced-apart, flexible flaps 38a and 38b integrally attached to one of the opposite side walls of circumferentially alternate ribs. In this embodiment, the circumferentially alternate ribs include ribs 30 and 34. Thus, for example, flaps 38a are attached to side walls 30a and 34a, whereas flaps 38b are attached to their respective opposite side walls 30b and 34b (FIG. 3). This configuration permits each of the radially outermost ends 30c–36c of the ribs to contact the periphery of the aperture in which the shank 20 resides. The flaps 38a and 38b extend radially outwardly of the circle partially defined by ends 30c–36c (FIG. 4), and flex towards the fastener head 12 when pushingly inserted into and located within a lower member aperture 40 (FIG. 6). Because the ribs are rigid and the flaps are flexible, and because both contact the periphery of aperture 40 simultaneously, the shank is positively maintained within the aperture in a substantially normal, non-tilted position relative to the pair of members 26 and 28. At all times while the fastener is maintained within the aperture 40, rigid ribs abut the aperture periphery. This feature also aids in maintaining a pair of panels in alignment, particularly if both panels are located on one side of lower head 16, as shown in FIG. 8, and if both panels have apertures of the same size. The ribs aid in maintaining alignment between two or more panels whenever these panels are positioned such that their apertures enclose the ribbed shank.

The resilient flaps have a memory which causes their return to the original, unflexed position after passing through the aperture 40, so that the flaps adjacent the underside 42 of the lower member 28 abut the underside to maintain the fastener in an axially immobile position relative to the members. Further, the flaps secured to one of the opposite side walls 30a of a particular rib 30 are axially offset from flaps 38b secured to the other of the opposite side walls 30b of that rib 30 (see FIG. 1). As stated above, this offset relationship enables the fastener to secure panels having a greater variety of thicknesses than would be possible using the same number of flaps in a non-offset configuration.

The fastener in FIG. 8 is shown with its shank portion within the apertures 44 and 46 of members 48 and 50, respectively. The fastener is fabricated to be of a sufficiently large size so that its ribs engage the periphery of aperture 46. Although not all the ribs engage the periphery of aperture 44, the fastener is held in the normal position by member 50. The member 48 in FIG. 8 may be shifted laterally, or to the right and left, but not axially relative to member 50. The fastener is thus maintained in a normal position relative to members 48 and 50 notwithstanding the different sizes of apertures 44 and 46.

A fastener 10 comparable to that shown in FIG. 8 and assembling members 48 and 50, but without rigid ribs, would have only the flexible flaps securing it within aperture 46. Consequently, the fastener 10 could tilt relative to the normal position, as, for example, the fastener of FIG. 8 being tilted to the right. In that instance, the surface area of the flap labeled 38a in FIG. 8, that flap being shown attached to rib 30, abutting the underside 52 of member 50, would be greater than the surface area of the flap 38a also abutting the underside 52, that flap being attached to rib 34 (not shown). The greater the surface area of a given flap abutting the underside of the member, the more resistance by and the greater forces acting upon that flap during removal and thus the greater the likelihood that that flap will be broken by overstress upon removal. The fastener made in accordance with the invention may be readily removed from the aperture 46, as the fastener is always normally oriented with respect to the members, and the surface area of each of the flaps abutting the underside 52 of the member 50 is approximately equal.

FIGS. 9-12 are sectional views through shanks of fasteners which comprise several of the alternate embodiments of the invention. Each includes four ribs and a plurality of axially spaced-apart flaps attached to the opposite side walls of circumferentially alternate ribs. The radially outermost ends of the ribs connect the respective pairs of opposite side walls, and lie along a radius from the shank axis.

Figure 13:
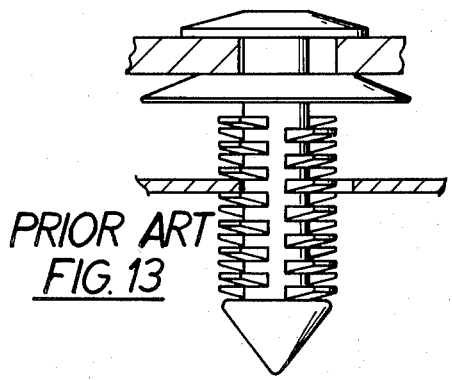
FIG. 13 is a prior art fastener, similar in some respects to the fastener of FIG. 8 but without ribs.
Figure 5:
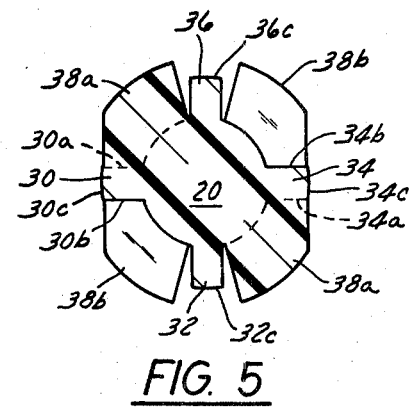
FIG. 5 is a sectional view of the fastener of FIGS. 2 and taken along line 5—5.

Even if a fastener comparable to that of FIG. 8 but without ribs were to remain in its normal position during removal from the members, the fastener could nevertheless be damaged. A prior art fastener, comparable to that of FIG. 8 but without ribs, is shown in FIG. 13. The fastener is shown residing in a very thin piece of sheet metal, as, for example, a door panel of an automobile. The panel thickness is less than the spacing between two flaps of the fastener, and thus the member may be situated between two of the flaps. If the fastener is normally oriented with respect to the members but offset from the center of the aperture, as shown in FIG. 13, pulling removal of the fastener from the members may also increase the likelihood that a flap will be broken by overstress or shearing. The present invention solves this problem by maintaining the fastener in the center of an aperture whereby all flaps equally accommodate the forces of pulling removal.

RECAPITULATION

The fastener constructed in accordance with the present invention comprises a plurality of rigid ribs which abut the periphery of panel member apertures so that the fastener is maintained in a normal position relative to that panel. The ribs maintain apertures of adjacent members in alignment, and the normal orientation helps prevent breakage or shearing of the flaps upon removal of the fastener from the apertures. The flaps and ribs simultaneously abut the periphery of an aperture, to ensure axial immobility of the fastener once in place and to prevent its tilting.

What I claim is:

1. A one-piece drive fastener for insertion through an aperture in a member and comprising: a head; a rigid shank extending from said head and terminating in a tip; a plurality of circumferentially spaced-apart rigid ribs extending radially outwardly from and along the length of said shank, each of said ribs having a pair of oppositely facing side walls and an outermost end engageable with a side of said aperture in said member; and a plurality of axially spaced-apart flexible flaps extending laterally outwardly from and along the length of at least some of said ribs, each flap comprising an inner edge said flap being integrally attached to one of said oppositely facing walls of only one of said ribs and extending radially outwardly beyond the side of said aperture, said ribs together forming a sufficiently large cross-sectional width whereby said shank is tightly engaged in said aperture and is thereby maintained in a substantially normal position relative to said member, said flaps being flexible to enable insertion of said fastener into said aperture and returnable to unflexed position thereafter whereby flaps adjacent a surface of said member maintain the fastener in axially immobile position.

2. The fastener as set forth in claim 1, wherein flaps secured to one rib are axially offset from flaps secured to another rib.

3. A fastener according to claim 1 or 2 wherein said shank is provided with at least one pair of ribs and wherein the outermost ends thereof are in axial alignment with each other.

4. A fastener according to claim 3 wherein some of said flaps are attached to oppositely facing walls of one rib in said pair and the remainder of said flaps are attached to oppositely facing walls of the other rib in said pair.

5. A fastener according to claim 1 or 2 wherein said inner edge of each flap is also integrally attached to a portion of said shank located between the rib to which said each flap is attached and an adjacent rib to which said each flap is non-attached.

6. A fastener according to claim 1 or 2 or 5 wherein said shank has a generally circular cross-sectional configuration.

7. A fastener according to claim 1 or 2 or 5 wherein said shank has a non-circular cross-sectional configuration.

8. A one-piece fastener for insertion through an aperture in a member and comprising: a head; a rigid shank extending from said head and terminating in a tip; at least a pair of circumferentially spaced-apart rigid ribs extending radially outwardly from and along the length of said shank, each of said ribs having a pair of oppositely facing side walls and an outermost end engageable with a side of said aperture in said member; and a plurality of axially spaced-apart flexible flaps extending laterally outwardly from and along the length of said ribs, each flap comprising an inner edge said flap being is integrally attached to said shank and to one of said oppositely facing walls of only one rib and extending radially outwardly beyond the side of said aperture, some of said flaps being disposed on each oppositely facing wall of said ribs and those flaps on one of said oppositely facing side walls of one rib being axially offset from those flaps on the other of said oppositely facing side walls of said one rib, said ribs together forming a sufficiently large cross-sectional width whereby said shank is tightly engaged in said aperture and is thereby maintained in a substantially normal position relative to said member, said flaps being flexible to enable insertion of said fastener into said aperture and returnable to unflexed position thereafter whereby flaps adjacent a surface of said member maintain the fastener in axially immobile position.

9. A fastener according to claim 8 wherein said shank has a generally circular cross-sectional configuration.

10. A fastener according to claim 8 wherein said shank has a non-circular cross-sectional configuration.

11. A fastener according to claim 9 or 10 wherein said head comprises a lower resilient head portion adjacent said shank and an upper head portion connected to but axially spaced from said lower head portion.

* * * * *